July 17, 1962  S. B. JONES  3,044,512
CLAMP
Filed May 31, 1960  2 Sheets-Sheet 1
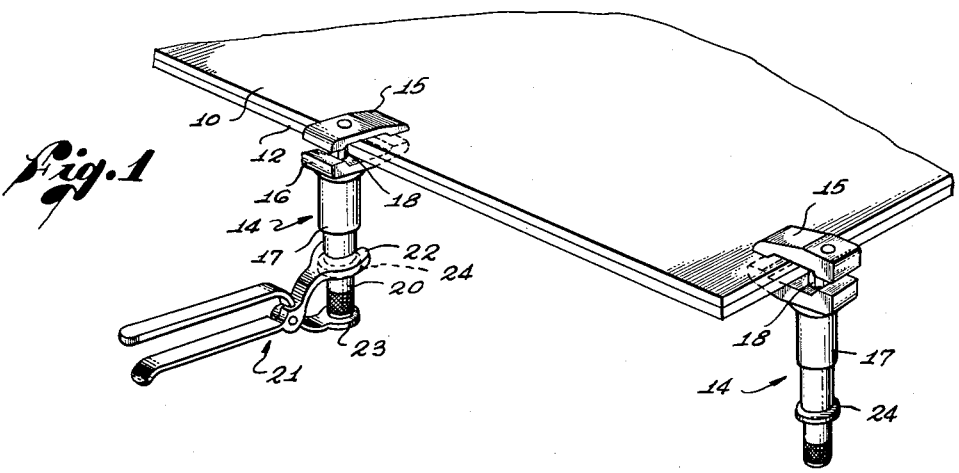
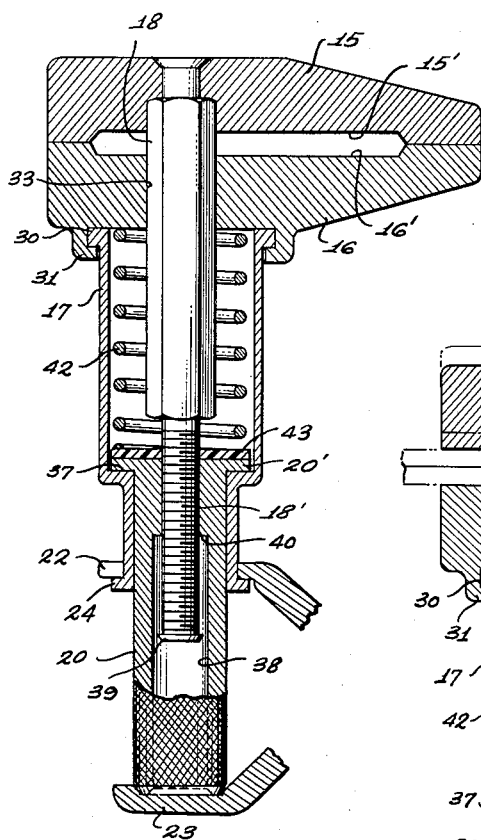
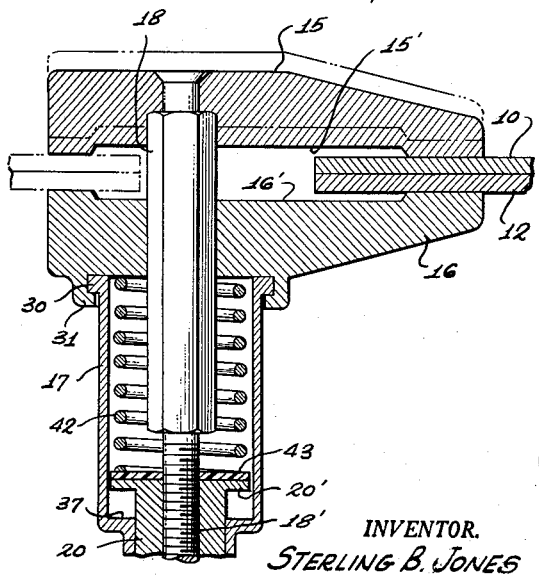
INVENTOR.
STERLING B. JONES
BY Fulwider Mattingly & Huntley
Attorneys July 17, 1962  S. B. JONES  3,044,512
CLAMP
Filed May 31, 1960  2 Sheets-Sheet 2
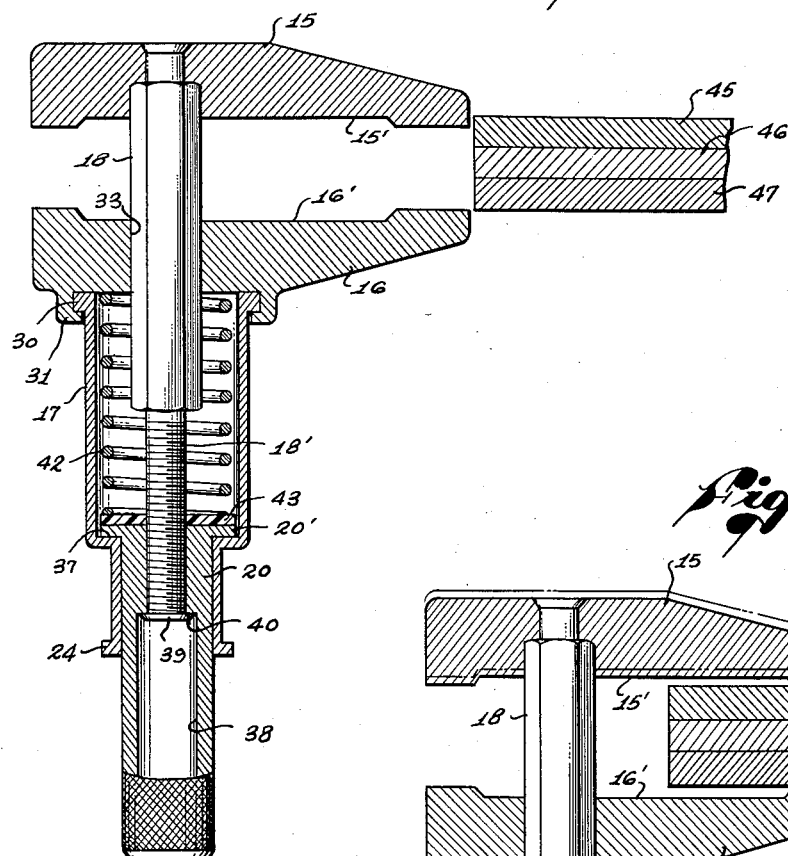
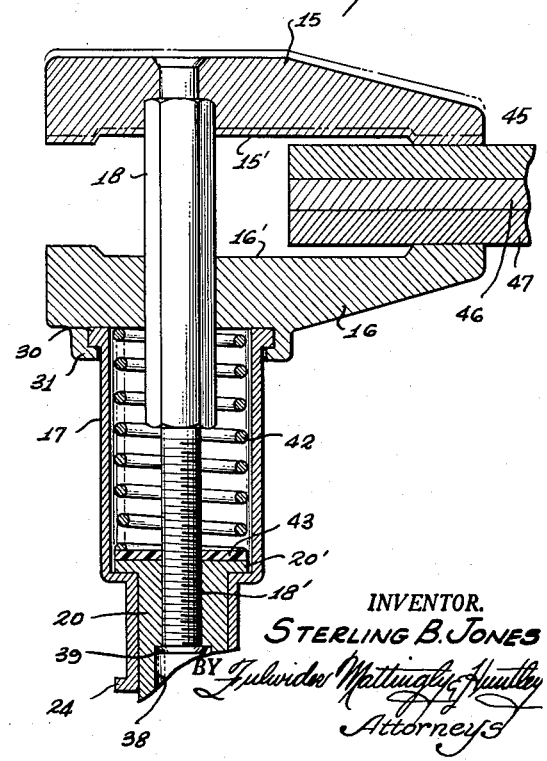
INVENTOR.
STERLING B. JONES

United States Patent Office 3,044,512
Patented July 17, 1962

3,044,512
CLAMP
Sterling B. Jones, West Covina, Calif., assignor to Monogram Precision Industries, Inc., Culver City, Calif., a corporation of California
Filed May 31, 1960, Ser. No. 32,733
3 Claims. (Cl. 269—254)

This invention relates to clamping devices, and more particularly to a unique side-grip clamp for holding sheets of material together adjacent their edges.

In the production of many items, it is often necessary to form panels of a number of sheets of material. These sheets, which may be of any material (e.g., of wood or metal), must be held firmly together while various operations are performed thereon, e.g., as where adhesive material is disposed between the sheets and they are to be held firmly together while the adhesive dries, or where a plurality of sheets are to be clamped together to have holes punched or drilled in all the sheets simultaneously, thereby to facilitate mass production of sheets having the same arrangement of holes therein.

A clamping device commonly used for gripping stacked sheets of material at their edges is the well known spring-biased side-grip clamp. Typically, a side-grip clamp of the prior art is a device in which a pair of juxtaposed jaw members are secured respectively to a housing and to a rod that extends through the housing. A compression spring is placed around the rod, and extends from the interior of the housing to the end of the rod opposite the jaw that is mounted therein. In this manner, the spring continually forces the rod in a direction that causes the jaws to be drawn together.

To clamp sheets of material together with a side-grip clamp as above described, the spring-biased end of the rod is forced inwardly of the housing so that the jaw on the rod is separated from the jaw on the housing. After thus separating the jaws sufficiently, they are slipped over the edges of the sheets to be clamped, and the rod is released. Such release causes the spring to urge the jaws together, whereby to clamp the sheets between them.

Side grip clamps of the prior art suffer certain disadvantages. One of the chief disadvantages is that, for different separations of the jaws, as for clamping different numbers of sheets together, the rod must be forced through a greater distance to permit the jaws to clamp the thicker set of sheets than is required to permit the jaws to clamp the thinner set of sheets. Also, the jaws are caused to clamp the thicker set of sheets with considerably greater force than is brought to bear in clamping the thinner set of sheets.

In order to permit the prior art side-grip clamp to be used for clamping together sheets of material of a wide variety of thicknesses, it is necessary to use a rather long compression spring, of few turns of relatively small diameter material, in order to permit the rod to be moved readily through the distance necessary to obtain maximum separation of the jaws. As often happens, the spring tension is sufficient for firmly clamping the thicker set of sheets, but is wholly inadequate to permit a minimum of relatively thin sheets to be clamped together. The reason is that not much force is required to separate the jaws only a slight amount, and consequently there is relatively small clamping force applied when the jaws have to be separated only slightly in order to receive the edges of sheets of material between them.

In order to establish a reasonably firm clamping action for different separations of the jaws, a compromise is reached by using a spring which provides a reasonably firm clamping force for a desired minimum separation. The result of this arrangement is that it requires too much force to try and separate the jaws to the maximum extent possible to receive the edges of sheets of maximum thickness that can be placed between them, and correspondingly the jaws exert such a great clamping force against such sheets as to be forced into the surfaces of the materials to form indentations therein.

Such marring of the surfaces of the sheets of material is objectionable from several standpoints. If the panel formed of such sheets is to be a visible part of an ornamental article, the indentations detract from the appearance of the article. If the panels are to be used as structural members, as for the outer "skin" of an aircraft, such as high-speed jet aircraft, such indentations constitute areas of resistance to airflow over the surface of the aircraft. At sufficiently high speeds, such resistance may lead to frictional heating of the surface of the skin and eventual destruction of the aircraft. Since such conditions cannot be tolerated, there is a high rejection rate for such panels.

It is an object of this invention to provide a unique clamp suitable for use as a side-grip clamp, and which overcomes the above and other disadvantages of prior art clamps.

It is another object of this invention to provide a quick-connect and quick-disconnect side-grip clamp which does not require different strokes of the spring-biased rod for separating the jaws the amount required to effectively grip different sets of sheets of different thicknesses between them.

A further object of this invention is to provide a side-grip clamp having a pair of spring-biased jaws adapted to grip the edges of metal sheets therebetween with the same gripping force, regardless of the separation of the jaws.

It is also an object of this invention to provide a unique side-grip clamp having opposed jaws which are movable relative to each other, one of which is mounted on a spring-biased plunger, and in which the plunger is adapted to be moved through the same distance for placing the jaws over the edges of a set of sheets, regardless of the total thickness of the sheets.

A still further object of this invention is to provide a unique side-grip clamp wherein a compression spring can be utilized that is stronger than is possible to use with prior art side-grip clamps, but which is used in a manner without exerting an unsafe or undesirable clamping force of sets of sheets of material of different combined thicknesses.

It is yet another object of this invention to provide a unique side-grip clamp which comprises a minimum number of component parts of simple design and rugged construction, characterized by ease of assembly and simplicity of operation.

The above and other objects and advantages of this invention will become apparent from the following description taken in conjunction with the accompanying drawings of a preferred embodiment thereof, in which:

FIGURE 1 is a perspective view of a portion of a panel formed of a pair of sheets of material, wherein the sheets are clamped together at their edges between a number of the clamps of my invention;

FIGURE 2 is a longitudinal sectional view of my clamp, showing an arrangement wherein the jaws are moved apart a predetermined distance from a touching relation to receive the edges of a set of sheets between them;

FIGURE 3 is a partial sectional view showing the jaws in the position wherein the set of sheets is clamped between them;

FIGURE 4 is a longitudinal sectional view, similar to FIGURE 2, showing the jaws initially separated sufficiently so that the same stroke of the plunger as in the arrangement of FIGURE 2 is all that is required to cause the thicker set of sheets of material to be clamped between the jaws with the same force as the thinner set of sheets in FIGURE 2; and FIGURE 5 is a partial sectional view showing the jaws in the position wherein the thicker set of sheets is clamped between them.

Referring to FIGURE 1, there is shown a pair of sheets of material 10, 12 to be clamped together for a desired purpose. The sheets 10, 12 are held together by a number of clamps 14 located at different positions along their edges. Each clamp 14 has a pair of jaws 15, 16, wherein one of the jaws 16 is secured to one end of a housing 17. The other jaw 15 is secured to one end of a non-rotatable, axially movable rod 18 that extends through the other jaw 16 and into the housing 17. Exteriorly of the housing 17 is a plunger element 20, which at its inner end is secured to the rod 18 and engages one end of a compression spring (to be described) that is located in the housing 17. With this arrangement, the jaws 15, 16 are continually urged toward each other.

Manipulation of the clamp 14 is effected by means of a tool 21 which operates in the manner of a pair of pliers, and which is provided at its ends with arms terminating in a forked end 22 and a cup 23. The end of the housing 17 is provided with a radial shoulder 24, and the tool 21 is positioned, as shown, with the forked end 22 engaging the shoulder 24, and with the cup 23 disposed against the outer end of the plunger element 20. Upon manipulating the tool so as to force the forked end 22 and the cup 23 toward each other, the plunger element 20 is forced inwardly of the housing against the spring pressure, thereby forcing the jaw 15 to be separated from the jaw 16. In this manner, the jaws 15, 16 are separated to permit them to be placed over the edges of the sheets 10, 12, whereupon the pressure on the tool 21 is relaxed to permit the plunger 20 to be forced rearwardly of the housing 17 to bring the jaws 15, 16 into contact with the opposed surfaces of the sheets 10, 12.

The arrangement of the parts of the clamp 14 is shown in FIGURES 2-5. The housing 17 is a tubular element which, at the end opposite the shoulder 24, is provided with a rounded flange 30. The adjacent surface of the jaw 16 is provided with a circular rim 31 within which the flange 30 is disposed, and the rim 31 is turned over the flange 30 and against the outer surface of the housing 17, thereby securing the jaw 16 to the housing 17.

The rod 18 and the opening 33 in the jaw 16 through which the rod 18 extends are shaped, as in the hexagonal form shown, to prevent rotation of the jaw 15 about the axis of the rod 18. Thus, the rod 18 can move only axially. Accordingly, since the jaw 16 is fixed to the housing 17, the jaws are held against relative rotation, thereby to accurately maintain the jaws in alignment.

The rod 18 at its inner end terminates in a reduced-diameter threaded portion 18′, onto which the inner end of the plunger element 20 is threaded. The plunger 20 is a tubular element which at its inner end is provided with a radial flange 20′. A shoulder 37 in the housing 17 provides a limit stop for the flange 20′ to limit rearward movement of the plunger 20.

The plunger 20 is internally threaded along a short portion of its length starting at its inner end. As shown, the threaded portion of the plunger is connected to a relatively large-diameter bore 38. Thus, the threaded portion 18′ of the rod 18 can extend into the bore 38. The outer end of the rod 18 is peened, as at 39, to provide an end portion of a diameter greater than the threaded portion of the rod. With this arrangement, the plunger and the rod cannot be separated, due to the peened portion 39 engaging the transition shoulder between the bore 38 and the threaded portion of the plunger 20.

The spring means previously mentioned comprises a compression spring 42 disposed in the housing 17. The spring 42 at its ends abuts the rear surface of the jaw 16 and a washer 43 on the forward surface of the plunger 20. The washer preferably is non-metallic, e.g., plastic, and prevents the end of the spring from marring the flange 20′. It will be seen that the spring 42 acts against the plunger 20, tending to force it rearwardly of the jaw 16, thereby to urge the jaw 15 toward the jaw 16.

As previously mentioned, the clamp of my invention is unique in that, for different sets of sheets to be clamped together, the same stroke of the plunger 20 effectively separates the jaws 15, 16 sufficiently to permit them to be placed over the edges of the sheets. In FIGURE 3, for example, there is illustrated a pair of sheets of material 10, 12 of a thickness such that the jaws can be moved a predetermined distance, e.g., 0.25 inch, from a normal position of engagement to a sufficient separation to be placed over the edges of the sheets 10, 12.

In contrast to the thin sheets 10, 12 of FIGURE 3, it may be necessary to clamp a set of sheets of material 45—47 (see FIGURES 4 and 5) that together are considerably thicker than the set of sheets 10, 12. Again, the plunger 20 is moved through the same distance as previously required to cause the jaws to clamp the thinner sheets of material between them. To permit this short-stroke operation, the plunger 20, preparatory to clamping the sheets 45—47, is turned in a direction as though to back it off of the threaded portion 18′ of the rod 18, whereby to cause the rod 18 to move relative to the plunger so the jaw 15 moves away from the jaw 16. As shown in FIGURE 4, the plunger 20 is turned until the jaws 15, 16 have a normal separation such that only the desired short stroke of the plunger is required to separate them enough to receive the sheets 45—47 between them. After the jaws are placed over the sheets 45—47 (see FIGURE 5), the plunger is released, whereupon the sheets 45—47 are firmly clamped between the jaws.

Referring to FIGURES 2 and 4, it will be noted that the spring 42 in both instances maintains the plunger 20 in a position wherein its flange 20′ is against the shoulder 37 at the rear end of the housing 17. In other words, for any situation, the force required to separate the jaws the requisite amount, so as to clamp sheets of material of any desired thicknesses, is the same. Furthermore, it will be apparent that the spring 42 is different situations (such as in FIGURES 3 and 5) causes the jaws to exert the same clamping force. As will be appreciated, these are tremendous advantages over prior art clamps. For example, since substantially the same short stroke is required to separate the jaws to receive sheets of material of widely different thicknesses, a compression spring can be employed that is considerably stronger than could possibly be used where the jaws are always moved from a position wherein they initially contact each other. Also, my invention permits effective clamping action with substantially the same force throughout the range of the clamp.

It will be noted that the jaws of my clamps are elongated, and are oppositely extended across the rod 18, with the portions on one side of the axis of the rod being much longer than the portions on the other side of its axis. Where the sheets of material can be gripped only very near the edges thereof, the shorter jaw lengths may be employed. With reference to the positions of the clamps in FIGURE 1, all that is necessary to accomplish this is to turn the clamps around so that the shorter jaw lengths clamp the sheets between them.

Clamping faces provided between the jaws on both sides of the rod 18 are preferably small in area, so as to have large pressure per unit area. To this end, the jaws are undercut, as at 15′, 16′.

While I have illustrated a particular embodiment of my invention, it will be apparent from the foregoing that various modifications may be made therein without departing from the spirit and scope of my invention. Therefore, I do not intend that my invention be limited, except as by the appended claims.

I claim:
1. A side-grip sheet clamp comprising: an elongated tubular housing having a central opening which at one end is reduced, thereby to provide a lateral internal shoulder adjacent said one end; a first jaw element having a noncircular opening therethrough secured to the opposite end of said housing; a rod matingly slidable in said opening; a second jaw element fixed to the end of said rod adjacent said first jaw element; a compression spring in said housing surrounding said rod for forcing said rod inwardly to urge said second jaw element toward said first jaw element, whereby said jaw elements have a clamping action, and whereby said rod must be forced against the bias of the spring to separate said jaw elements sufficiently to be placed over the edges of a stack of sheets to be clamped together; means to effect the same movement of said rod and the same clamping force by said jaw elements for different thicknesses of sheet stacks to be clamped including a threaded extension on the inner end of said rod; and an elongated member having a central opening therethrough which at one end is an internally threaded reduced diameter portion, said elongated member being slidable and rotatable in said one end of said housing, said elongated member at its inner end having a flange engaged by the adjacent end of said spring, said flange being located inwardly of said shoulder so as normally to be kept in abutment with said shoulder by said spring, whereby selective rotation of said elongated member causes said rod to move longitudinally to effect a desired separation of said jaw elements, thereby to permit a subsequent sliding movement of said elongated member in said housing to compress said spring a predetermined amount to additionally separate said jaw elements for placing them in clamping engagement with a stack of sheets to be clamped.

2. A clamp comprising: a housing; a pair of clamp elements, one of which is secured to said housing; plunger means in said housing having a nonrotatable portion slidable in said housing and said one clamp element, said nonrotatable portion supporting the other clamp element adjacent said one clamp element, said plunger means also including a portion exteriorly of said housing and adjustably threaded on said nonrotatable portion; axially interfering flange elements in said housing and on said adjustably threaded portion of said plunger means; and spring means in said housing normally urging said plunger means and housing in opposite directions to positions wherein said flange elements are in abutment, thereby urging said clamp elements to positions of predetermined separation determined by the position of adjustment of said threaded portion.

3. A clamping device comprising: a tubular housing, said housing adjacent one end having an inwardly extending shoulder; a jaw element secured to the opposite end of said housing, said jaw element having a noncircular opening extending therethrough; a second jaw element abutting said first-mentioned jaw element; a rod of noncircular cross section to be matingly received and slidable in said noncircular opening said rod being affixed at one end to said second jaw element, said rod extending through said noncircular opening of said first-mentioned jaw element and through said housing, said rod having a threaded portion of circular cross section extending past said shoulder in the housing; an elongated plunger body having one end extending into said one end of said housing, said body having an opening therethrough which has a portion of reduced diameter at one end thereof, said reduced diameter portion being threaded onto said threaded end of said rod, said body having a radial flange in said housing positioned so that said shoulder is between said flange and said one end of said housing; a spring surrounding said rod and compressed between first-mentioned jaw element and said flange on said body for biasing said flange toward abutment with said shoulder, said body being adjustable on said rod to effect a predetermined initial separation of said jaw elements; and a radial extension member on said housing adjacent said one end thereof to facilitate grasping said housing and the outer end of said body so as to force them axially towards each other, thereby to separate said jaw elements further from said predetermined initial separation.

References Cited in the file of this patent
UNITED STATES PATENTS

| | | |
|---|---|---|
| 1,307,890 | Baehr | June 24, 1919 |
| 1,388,866 | Lambert | Aug. 30, 1921 |
| 1,683,201 | Lindquist | Sept. 4, 1928 |
| 2,319,377 | Wallace et al. | May 18, 1943 |